US011205216B2

(12) United States Patent
Tagami

(10) Patent No.: US 11,205,216 B2
(45) Date of Patent: Dec. 21, 2021

(54) DELIVERY SERVICE SYSTEM, DELIVERY SERVICE METHOD, SERVER FOR DELIVERY SERVICE, AND DELIVERER TERMINAL FOR DELIVERY SERVICE

(71) Applicant: World Force International Co. Ltd., Tokorozawa (JP)

(72) Inventor: Osamu Tagami, Tokyo (JP)

(73) Assignee: WORLD FORCE INTERNATIONAL CO. LTD., Saitama (JP)

( * ) Notice: Subject to any disclaimer, the term of this patent is extended or adjusted under 35 U.S.C. 154(b) by 0 days.

(21) Appl. No.: 16/665,267

(22) Filed: Oct. 28, 2019

(65) Prior Publication Data

US 2020/0126149 A1    Apr. 23, 2020

Related U.S. Application Data

(63) Continuation of application No. 15/578,747, filed as application No. PCT/JP2016/066489 on Jun. 2, 2016, now Pat. No. 10,497,050.

(30) Foreign Application Priority Data

Jun. 3, 2015   (JP) .............................. JP2015-112887

(51) Int. Cl.
*G06Q 30/06*    (2012.01)
*G06Q 10/08*    (2012.01)
(Continued)

(52) U.S. Cl.
CPC ......... *G06Q 30/0637* (2013.01); *G06Q 10/08* (2013.01); *G06Q 10/087* (2013.01);
(Continued)

(58) Field of Classification Search
CPC ................................................. G06Q 30/0637
See application file for complete search history.

(56) References Cited

U.S. PATENT DOCUMENTS 9,937,531 B2 * 4/2018 Salonen ................... B07C 3/18
10,497,050 B2 * 12/2019 Tagami ............. G06Q 10/0834
(Continued)

FOREIGN PATENT DOCUMENTS

JP    2002041853 A  *  2/2002   ............. G06F 17/60

OTHER PUBLICATIONS

International Search Report from International Application No. PCT/JP2016/066489 dated Aug. 2, 2016.
Extended European Search Report dated Oct. 4, 2018.

*Primary Examiner* — Thomas Randazzo
(74) *Attorney, Agent, or Firm* — Brundidge & Stanger, P.C.

(57) ABSTRACT

A delivery service system including a server that can be connected to a plurality of client terminals and a plurality of deliverer terminals 10 via the internet, wherein information about a client's desired pickup/delivery date, time, etc., for a pickup/delivery item, the information being input using the plurality of client terminals over the internet, is registered in databases on the server for each item. For new items registered in the databases, the server receives contract applications for items in which the area of the client's address corresponds to a service area from deliverer terminals that have accessed the databases via the internet, registers the applications in the databases, and notifies the client terminal associated with a new item for which applications are being received about the applications.

8 Claims, 10 Drawing Sheets

(51) Int. Cl.
*G06Q 50/28* (2012.01)
*B65G 61/00* (2006.01)

(52) U.S. Cl.
CPC ..... *G06Q 10/0834* (2013.01); *G06Q 10/0835* (2013.01); *G06Q 10/0838* (2013.01); *G06Q 30/0613* (2013.01); *G06Q 30/0635* (2013.01); *G06Q 50/28* (2013.01); *B65G 61/00* (2013.01)

(56) References Cited

U.S. PATENT DOCUMENTS

| | | | |
|---|---|---|---|
| 10,810,642 B1* | 10/2020 | Hawilo | G06Q 30/06 |
| 2002/0016744 A1 | 2/2002 | Madoka | |
| 2002/0129238 A1* | 9/2002 | Toh | H04L 63/061 |
| | | | 713/153 |
| 2002/0143655 A1* | 10/2002 | Elston | H04L 29/06 |
| | | | 705/26.81 |
| 2004/0122695 A1* | 6/2004 | Tsai | G06Q 30/0283 |
| | | | 705/400 |
| 2006/0020366 A1* | 1/2006 | Bloom | B07C 3/02 |
| | | | 700/226 |
| 2016/0267562 A1* | 9/2016 | Follis | G06Q 30/0613 |
| 2016/0283993 A1* | 9/2016 | Wouhaybi | G06Q 30/0605 |
| 2017/0220966 A1* | 8/2017 | Wang | G06Q 10/08 |
| 2018/0053149 A1* | 2/2018 | Sarrapy | G06Q 10/06314 |

* cited by examiner

FIG. 3

| NAME | ID/PASSWORD | SERVICE AREA | DELIVERER INFORMATION |
|---|---|---|---|
| P | | A, C | |
| Q | | B, C | |
| R | | B, D | |
| S | | C, D | |
| ... | | | |

DELIVERER DB 14

FIG. 4

| NAME | ID/PASSWORD | ADDRESS, ETC. | CONSIGNER INFORMATION |
|------|-------------|---------------|------------------------|
| x | | a-cho, A Ward | |
| y | | c-cho, C Ward | |
| z | | b-cho, B Ward | |
| ... | | | |

CONSIGNER 12

FIG. 5

| NO. | DATE | CONSIGNER | DESIRED PICKUP/DELIVERY DATE AND TIME | DRIVER IN CHARGE | STATUS | PICKUP/DELIVERY INFORMATION | PRIORITY |
|---|---|---|---|---|---|---|---|
| 0001 | 2015.05.01 | X | 5.01.18h5.01.19h | P | COMPLETION CONFIRMATION | | HIGH |
| 0002 | 2015.05.02 | Y | 5.02.18h5.02.18h | Q | UNDER DELIVERY | | MIDDLE |
| 0003 | 2015.05.02 | Z | 5.02.18h5.02.17h | Q | APPLN WAITING | | LOW |
| 0003 | 2015.05.02 | SAME AS ABOVE | SAME AS ABOVE | R | SAME AS ABOVE | | SAME AS ABOVE |
| ... | ... | | | | | | |

FIG. 8

| NO. | DATE | CONSIGNER | DESIRED PICKUP/DELIVERY DATE AND TIME | DRIVER IN CHARGE | POSSIBLE PICKUP/DELIVERY DATE AND TIME | STATUS | PRIORITY |
|---|---|---|---|---|---|---|---|
| 0001 | 2015.05.01 | X | 5.01.17h5.01.18h | P | 5.01.18h5.01.18h | COMPLETION CONFIRMATION | HIGH |
| 0002 | 2015.05.02 | Y | 5.02.18h5.02.18h | Q | 5.02.18h5.02.18h | UNDER DELIVERY | MIDDLE |
| 0003 | 2015.05.02 | Z | 5.02.16h5.03.17h | Q | 5.02.16h5.03.18h | APPLN WAITING | LOW |
| 0003 | 2015.05.02 | SAME AS ABOVE | SAME AS ABOVE | R | 5.02.16h5.03.18h | SAME AS ABOVE | SAME AS ABOVE |
| ... | ... | | | | | | |

FIG. 9

| NO. | DATE | CONSIGNER | DESIRED PICKUP/DELIVERY DATE AND TIME | DRIVER IN CHARGE OF PICKUP | DRIVER IN CHARGE OF DELIVERY | STATUS | PRIORITY |
|---|---|---|---|---|---|---|---|
| 0001 | 2016.05.01 | x | 5.01 16h/5.01.18h | P | P | COMPLETION CONFIRMATION | HIGH |
| 0002 | 2016.05.02 | y | 5.02.10h/5.02.16h | Q | Q | UNDER DELIVERY | MIDDLE |
| 0003 | 2016.05.02 | x | 5.02.16h/5.03.13h | Q | R | APPLN WAITING | LOW |
| 0003 | 2016.05.02 | SAME AS ABOVE | SAME AS ABOVE | Q | S | SAME AS ABOVE | SAME AS ABOVE |
| : | : | | | | | | |

DELIVERY SERVICE SYSTEM, DELIVERY SERVICE METHOD, SERVER FOR DELIVERY SERVICE, AND DELIVERER TERMINAL FOR DELIVERY SERVICE

CROSS-REFERENCED TO RELATED APPLICATION

This application is a Continuation of U.S. application Ser. No. 15/578,747, filed Dec. 1, 2017; which is a National Stage of International Application No. PCT/JP2016/066489, filed Jun. 2, 2016; which claims priority to Japanese Application No. 2015-112887, filed Jun. 3, 2015.

TECHNICAL FIELD

The present invention relates to a delivery service system for home delivery or the like and, in particular, relates to a delivery service system, a delivery service method, a server for delivery service, a program for the server, a recording medium thereof, and a deliverer terminal for delivery service in which pickup/delivery is determined according to voluntary matching between a consigner (client) and a delivery candidate.

BACKGROUND ART

In a typical example of a delivery service system for home delivery or the like, a native application is used as a platform, a PC or a mobile terminal or the like of a consigner (user, customer) as a client and a PC or a mobile terminal or the like of a deliverer (driver or the like) in charge of pickup/delivery of a cargo requested from the consigner are connected to a server of a delivery service company via the internet, and a delivery service is carried out using the application software operated on the server. The server includes a database which stores and manages information of consigners (names, addresses, telephone numbers, etc.), information of deliverers (names, service areas, etc.), information of items relating to pickup/delivery targets (kinds of cargos, pickup/delivery dates and times, etc.).

A consigner can access the application software operated on the server of the delivery service company via the internet using own mobile terminal or the like and can, for example, request pickup/delivery and check a delivery status.

The server registers pickup information (address of consigner, kind of cargo, pickup date and time, etc.) and delivery information (delivery date and time, delivery area, etc.) in the database in accordance with a request for pickup/delivery from a consigner, and notifies a deliverer, in charge of the address of the consigner, of the pickup/delivery request with reference to the database. In a case of performing pickup and delivery by separate deliverers, after a deliverer in charge of the address of the consigner picks up a cargo, the delivery request is transmitted to another deliverer in charge of a delivery area of the cargo. The server receives a pickup completion notification and a delivery completion notification from the deliverer and registers these notifications.

The deliverer in charge of the delivery performs pickup/delivery in accordance with the pickup request notification transmitted from the server of the delivery service company via the internet and, after completion of the pickup/delivery, transmits the delivery completion notification from the terminal to the server.

PRIOR ART DOCUMENT

Patent Document
Patent Document 1: JP-A-2003-146440
Patent Document 2: JP-A-2008-225925

SUMMARY OF INVENTION

Problems to be Solved by Invention

In this manner, in the delivery service system of the related art, all processes are performed via the server of the delivery service company, that is, pickup/delivery is performed under the control of the server. Accordingly, there arises the following problems.

1) If there is no deliverer near the address of a consigner, pickup cannot be performed quickly.

2) If pickup and delivery items are concentrated at a particular area, a load of a particular deliverer increases, and thus quick service cannot be provided.

3) There is no way for a consigner to select a deliverer performing pickup/delivery, and so convenience of a consigner cannot be improved.

4) The server of the delivery service company entirely controls and determines pickup/delivery, and a deliverer has no flexibility or the like in selection of date, time and area with respect to the pickup/delivery. Thus, there is no way for a deliverer to improve convenience.

The invention is performed in view of the aforesaid circumstances and an object of the invention is to provide a delivery service system, a delivery service method, a server for delivery service, and a deliverer terminal for delivery service which can improve convenience of a consigner (client) and a deliverer and surely improve convenience and certainty of the entire system.

Means for Solving Problems

According to the first aspect of the invention, there is provided a delivery service system including a server which can be connected to a plurality of client terminals and a plurality of deliverer terminals via an internet, wherein the server includes a database which manages information of the clients, information of the deliverers, and information concerning pickup/delivery items of the clients, the server registers, in the deliverer database, information of name, a pickup service area, etc. of each deliverer which is inputted in the server by being accessed from each of the plurality of deliverer terminals via the internet, the server registers, in the client database, information of name, address, etc. of each client which is inputted in the server by being accessed from each of the plurality of client terminals via the internet, the server receives information of desired pickup/delivery date and time, etc. concerning a pickup/delivery item of each client which is inputted in the server by being accessed from each of the plurality of client terminals via the internet, and registers the received information in the item management database for each item, the server searches, as to each new item registered in the item management database, deliverers each registering an area of client's address of the new item as the service area with reference to the deliverer database, and notifies the terminal of each searched deliverer of the new item, the server receives a contract application which is inputted with reference to the item management database within the server via the internet from each deliverer terminal having been notified of the new item, then registers the contract application in the management database and notifies the client terminal of the new item of the contract application via an email, and the server receives via the internet a notification representing approved one of the deliverers having inputted the contract application, from the client terminal having received the contract applications as to the new item, and notifies the terminal of the approved deliverer via an email that the contract application is approved, whereby the approved deliverer performs pickup/delivery of the new item.

According to the second aspect of the invention, there is provided a server for delivery service which can be connected to a plurality of client terminals and a plurality of deliverer terminals via an internet, and includes a database which manages information of the clients, information of the deliverers, and information concerning pickup/delivery items of the clients, wherein the server registers, in the deliverer database, information of name, a pickup service area, etc. of each deliverer which is inputted in the server by being accessed from each of the plurality of deliverer terminals via the internet, the server registers, in the client database, information of name, address, etc. of each client which is inputted in the server by being accessed from each of the plurality of client terminals via the internet, the server receives information of desired pickup/delivery date and time, etc. concerning a pickup/delivery item of each client which is inputted in the server by being accessed from each of the plurality of client terminals via the internet, and registers the received information in the item management database for each item, the server searches, as to each new item registered in the item management database, deliverers each registering an area of client's address of the new item as the service area with reference to the deliverer database, and notifies the terminal of each searched deliverer of the new item, the server receives a contract application which is inputted with reference to the item management database within the server via the internet from each deliverer terminal having been notified of the new item, then registers the contract application in the management database and notifies the client terminal of the new item of the contract application via an email, and the server receives via the internet a notification representing approved one of the deliverers having inputted the contract application, from the client terminal having received the contract applications as to the new item, and notifies the terminal of the approved deliverer via an email that the contract application is approved, whereby the approved deliverer performs pickup/delivery of the new item.

According to the invention configured in this manner, in the server, a contract application for each item is authorized to a deliverer and selection of one of applied deliverers is authorized a consigner (client), so that an item is performed according to voluntary matching between the deliverers and the consigner (client) with reference to the database in such a way that the PC of a delivery service company is not directly concerned with the matching at all.

Initial registration of consigners and deliverers is performed via the server and registered in the database. Also receipt of a request for pickup/delivery from a consigner is performed via the server and registered in the database. In contrast, a notification of an item to a deliverer and a notification to a consigner from a deliverer are each performed, for example, on a basis of an email. That is, these notifications are performed via the server between the consigner and the deliverer.

Further, a pickup completion notification and a delivery completion notification are each performed via the server between a consigner and a deliverer. Various information of consigners and deliverers and contents of notifications are stored in the database of the server. Contents of the database can be appropriately checked by the PC of the delivery serviced company.

In this manner, according to the invention, a deliverer in charge of pickup/delivery is determined between a consigner and deliverers in such a way that none of the server and the PC of the delivery service company are concerned with the determination at all.

Advantageous Effects of Invention

Consequently, according to the delivery service system and the like of the invention, for example, the following effects are attained.

On a consigner side, since the consigner can appropriately select a deliverer with reference to sex, age, personal history, etc. of each of applied deliverer candidates while viewing a deliverer information screen, convenience of a consigner can be remarkably improved as compared with the related art.

A deliverer in charge of pickup/delivery is not determined under the control of the server of the delivery service company but determined according to voluntary matching between deliverers and a consigner. A deliverer is therefore allowed to have large flexibility or the like in selection of date, time and area with respect to the pickup/delivery, whereby convenience of the deliverer can be remarkably improved as compared with the related art. Similarly, convenience of the consigner can be improved.

BRIEF DESCRIPTION OF DRAWINGS

FIG. 3 is a diagram illustrating an example of a deliverer DB in the delivery service system according to the embodiment of the invention.

FIG. 4 is a diagram illustrating an example of a consigner DB in the delivery service system according to the embodiment of the invention.

FIG. 5 is a diagram illustrating an example of an item management DB in the delivery service system according to the embodiment of the invention.

FIGS. 6A, 6B, and 6C are diagrams illustrating examples of a screen of a consigner terminal or the like in the delivery service system according to the embodiment of the invention, in which FIG. 6A is a diagram illustrating an example of an item registration screen for consigner, FIG. 6B is a diagram illustrating an example of a deliverer information screen, and FIG. 6C is a diagram illustrating an example of a list of deliverers on the deliverer information screen.

FIGS. 7A and 7B are diagrams illustrating examples of a screen of a deliverer terminal or the like in the delivery service system according to the embodiment of the invention, in which FIG. 7A is a diagram illustrating an example of a new item information screen, and FIG. 7B is a diagram illustrating an example of a list of items on the new item information screen.

FIG. 8 is a diagram illustrating an example of an item management DB in a delivery service system according to a modification of the invention.

FIG. 9 is a schematic diagram illustrating configuration of the delivery service system according to the modification of the invention.

EMBODIMENTS OF INVENTION

Figure 1:
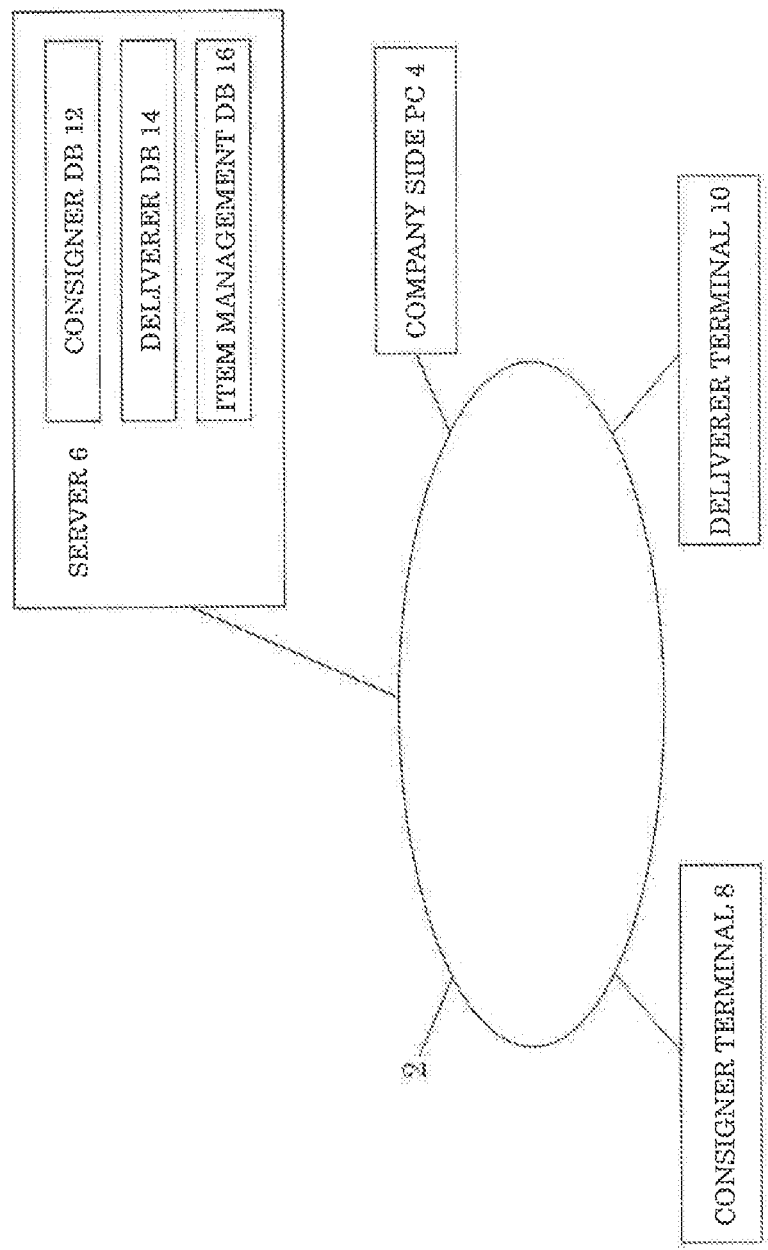
FIG. 1 is a schematic diagram illustrating configuration of a delivery service system according to an embodiment of the invention.

Hereinafter, a delivery service system, a delivery service method, a server for delivery service, and a deliverer terminal for delivery service according to embodiments of the invention will be explained with reference to drawings.

In the drawings, constituent elements having identical or substantially same functions are referred to by the common symbols, with explanation thereof being omitted.

FIG. 1 is a schematic diagram illustrating configuration of the delivery service system according to the embodiment of the invention. This embodiment will be explained as to a case in which a delivery candidate applies for a contract of pickup/delivery of a cargo in response to a request for pickup/delivery of the cargo as a delivery target from a consigner as a client, one of delivery candidates who submitted applicants is approved by the consigner, and the approved delivery candidate picks up/delivers the cargo using own vehicle (small-size vehicle or the like), motorcycle, bicycle or the like.

The delivery service system 1 is configured of a terminal of a delivery service company (PC: company side PC) 4 connected to an internet 2; a server, for example, a cloud server (hereinafter simply referred to as a server) 6 on the internet 2; a consigner's PC, smartphone, tablet terminal, mobile terminal or the like (hereinafter simply referred to as a terminal or the like) 8 connected to the internet 2; and a deliverer's PC, smartphone, tablet terminal, mobile terminal or the like (hereinafter simply referred to as a terminal or the like) 10 connected to the internet 2. Although a plurality of the terminals or the like 8 and a plurality of the terminals or the like 10 are connected to the internet 2, the drawing shows representatively only one for each of the two kinds of terminals or the like. The server 6 includes, as databases, for example, a consigner (client) database (DB) 12, a deliverer database (DB) 14, and an item management database (DB) 16.

In an example, a platform is web-browser based, and the PC of the delivery service company is connected to the PCs or mobile terminals or the like of consigners and the PCs or mobile terminals or the like of deliverers via the internet by means of a web application executed by the cloud server on the internet. The delivery service system according to the invention functions in a manner that all data/programs, etc. are stored, for example, in a rental could server and the individual terminals access the cloud server. The cloud server, for example, manages various kinds of information concerning consigners, deliverers and individual items using the databases, and appropriately provides consigners and deliverers with information. The PC of the delivery service company merely performs, for example, checking of the databases of the cloud server and supports consigners.

Figure 2:
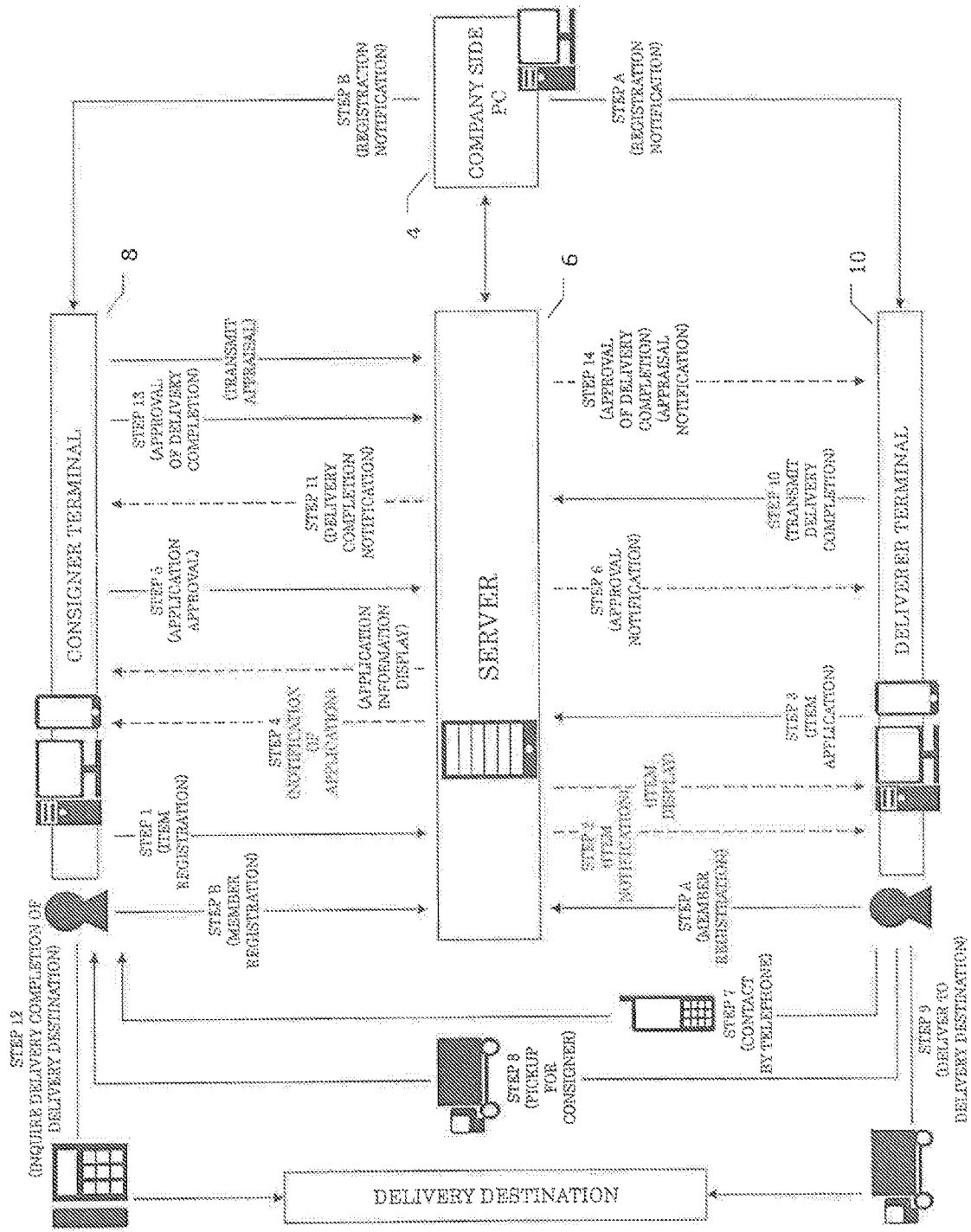
FIG. 2 is a schematic diagram explaining an operation of the delivery service system according to the embodiment of the invention.

FIG. 2 is a schematic diagram explaining an operation of the delivery service system according to the embodiment of the invention.

Processing illustrated in FIG. 2 is executed by application software of the server 6. The application software is stored in a memory such as a RAM of the server 6. For example, the application software may be stored in the memory from the outside via the internet. Alternatively, a computer readable recording medium such as a CD-ROM recording the application software may be inserted into a not-shown recording-medium reading device, and the application software may be read out from the recording medium and stored in the memory.

First, using own terminal or the like 10, each of deliverers contracting with the delivery service company clicks a URL of the delivery service company on the internet to activate the web browser, and inputs deliverer information such as a unique password, name, address, sex, age, telephone number, a mail address, personal history using a member registration form for deliverer of the web application on the server 6, thereby temporally registering the deliverer information in the deliverer DB 14. Then, the server 6 notifies the company-side PC 4 of this registration. Thus, on the company side, examination is performed on the deliverer with reference to the deliverer DB 14 using the company-side PC 4. If the deliverer passes the examination, the company formally registers the information of this deliverer in the deliverer DB 14 using the company-side PC 4. Further, the company-side PC 4 notifies, the terminal or the like 10 of this deliverer, of completion of the member registration and a unique ID by means of email, for example. Thereafter, the deliverer logs in to the server using the own ID/password from the terminal or the like 10, and inputs and registers own desired service areas, for example, A area and B area using an information input form for deliverer in the deliverer DB 14 (member registration step A). The service area is an area desired by the deliverer, that is, for example, an area in which the deliverer can pick up a cargo in a short time. The service area can be changed at any time at the desire of the deliverer. For example, in a case of picking up/delivering a cargo, the deliverer can correct own service area to an area near a delivery destination area by means of the information input form for deliverer, according to the delivery destination area using the terminal or the like.

Incidentally, in FIG. 2, notifications using email etc. are denoted by dotted lines, and other communications (data communications, telephones) and pickup/delivery works are denoted by solid lines.

FIG. 3 illustrates an example of the deliverer DB 14 in which the delivery information such as name, sex, age, picture, and personal history (driving history, copy of driver's license, etc.) of the deliverer as well as own ID/password is inputted and registered by the deliverer in the aforesaid manner, for each of the deliverers. In this case, for example, a deliverer P registers A Ward and C Ward as the service areas, a deliverer Q registers B Ward and C Ward as the service areas, and a deliverer R registers B Ward and D Ward as the service areas.

In the similar manner, using own terminal or the like 8, a consigner requesting pickup/delivery clicks the URL of the delivery service company on the internet to activate the web browser, and inputs consigner information such as a unique password, name, address, telephone number, a mail address using a member registration form for consigner of the web application on the server 6, thereby temporally registering the consigner information in the consigner DB 12. Then, the server 6 notifies the company-side PC 4 of this registration. Thus, on the company side, examination is performed on the consigner with reference to the consigner DB 12 using the company-side PC 4. If the consigner passes the examination, the company formally registers the information of this consigner in the consigner DB 12 using the company-side PC 4. Further, the company-side PC 4 notifies, the terminal or the like 8 of this consigner, of completion of the member registration and a unique ID by means of email, for example (member registration step B).

FIG. 4 illustrates an example of the consigner DB 12 in which the consigner information such as ID/password, name, and address of the consigner is inputted and registered, for each of the consigners.

Figure 6:
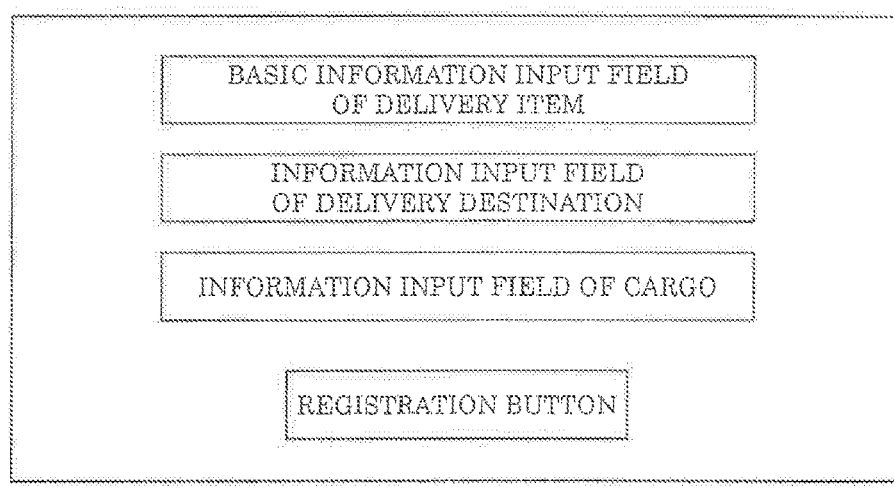

That is, by means of the own terminal or the like 8, the consigner logs in to the server using the own ID/password, and inputs pickup information (desired pickup date and time, kind of cargo, the number of cargos, etc.) and delivery information (name, address, telephone number, etc. of delivery destination, desired delivery date and time, etc.), using an item registration form on an item registration screen for consigner as illustrated in FIG. 6A. Then, the consigner pushes a register bottom to thereby register a new item (step 1). In FIG. 6A, etc., "basic information of delivery destination" represents desired pickup date and time, desired delivery date and time, kind of cargo, etc., "information of delivery destination" represents name, address, telephone number, etc. of delivery destination, desired delivery date and time, etc., and "information of cargo to be delivered" represents kind of cargo, the number of cargos, etc.

Then, the server 6 receives the pickup and delivery information, etc. of the new item registered by the consigner from the terminal or the like 8 of the consigner, then registers the received information in the item management DB 16 (see FIG. 5) described later together with the name of the consigner, and searches deliverers each registering the area of the consigner's address as the service area with reference to the deliverer DB 14, thereby notifying the terminal or the like 10 of each of the deliverers each registering the area of the consigner's address as the service area, of this new item by means of email, for example (step 2).

Figure 7:
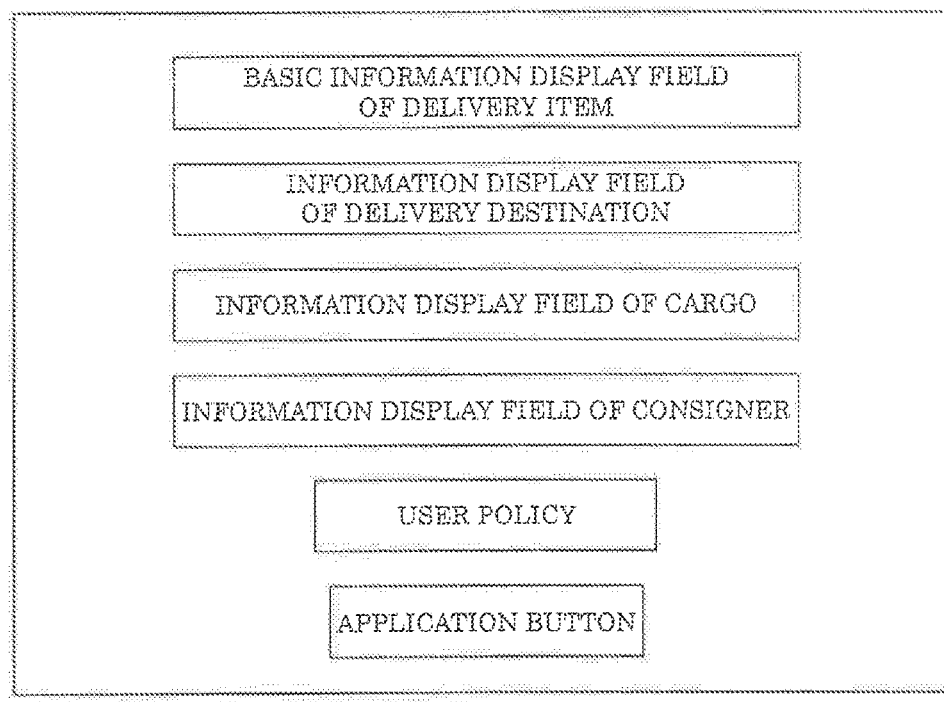
Figure 7B:
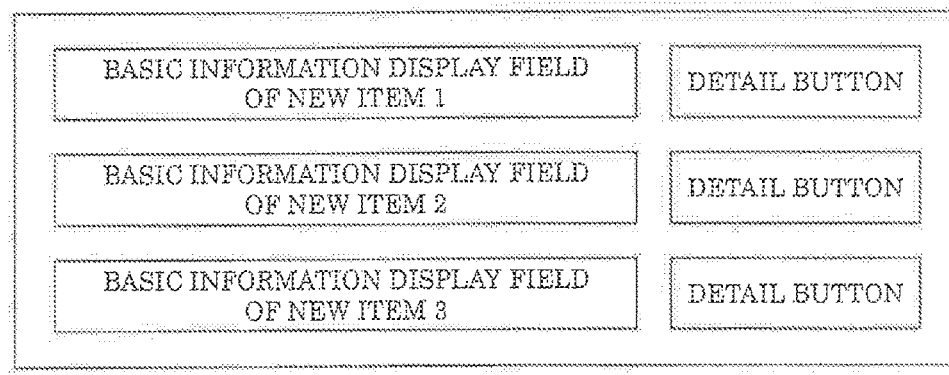

For example, if the address of the consigner z is in B Ward, the deliverers Q and R each registering B Ward as the service area are notified of the new item. The deliverer having received this notification clicks a URL within the email, whereby a browser is automatically activated and the new item information is displayed on the own terminal or the like 10. FIG. 7A shows an example of a screen of such new item information which displays the pickup information, the delivery information, etc. as well as the name and address of the consigner z. "Information of new registration person" represents, for example, name, address, telephone number, mail address, etc. of the consigner. When the deliverer contracts the new item, the deliverer clicks for example, an application button within the screen to apply for the contract (step 3). If there are plural new items within the service areas of the deliverer, information of the new items (for example, names, addresses, etc. of the consigners) is displayed as a list as illustrated in FIG. 7B. When the deliverer selects a display field and pushes a "detail button" adjacent to this display field, the screen transits to the screen of FIG. 7A, and thus details of the selected item is displayed. In this manner, the deliverer checks individual items, then selects desired one of the items to display details thereof as illustrated in FIG. 7A, and applies the desired item by pushing the application button. Incidentally, the deliverer can apply for plural items with reference to the pickup information and the delivery information of new items such that pickup date and time and the delivery date and time do not overlap to each other.

Figure 6B:
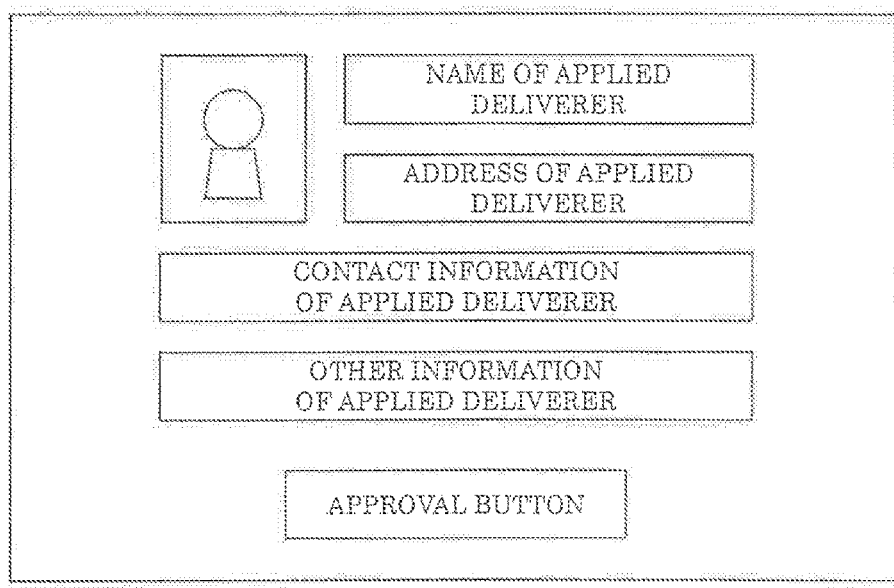

Then, the server 6 receives a contract application notification via the internet from the deliverer, then registers name of the applied deliverer, possible pickup/delivery date and time, etc. in the item management DB 16, and also notifies the terminal or the like 8 of the consigner of the applied item, for example, the consigner z that the deliverer has applied for the item, by means of email, for example (step 4). When the consigner having received this notification, for example, the consigner z clicks a URL within the email, whereby a browser is activated and information of the applied deliverer is displayed. FIG. 6B shows an example of such a deliverer information screen, which displays name, address, contact information (telephone number, mail address), face picture, and other information (sex, age, personal history, appraisal, etc.) of the applied deliverer.

Figure 6C:
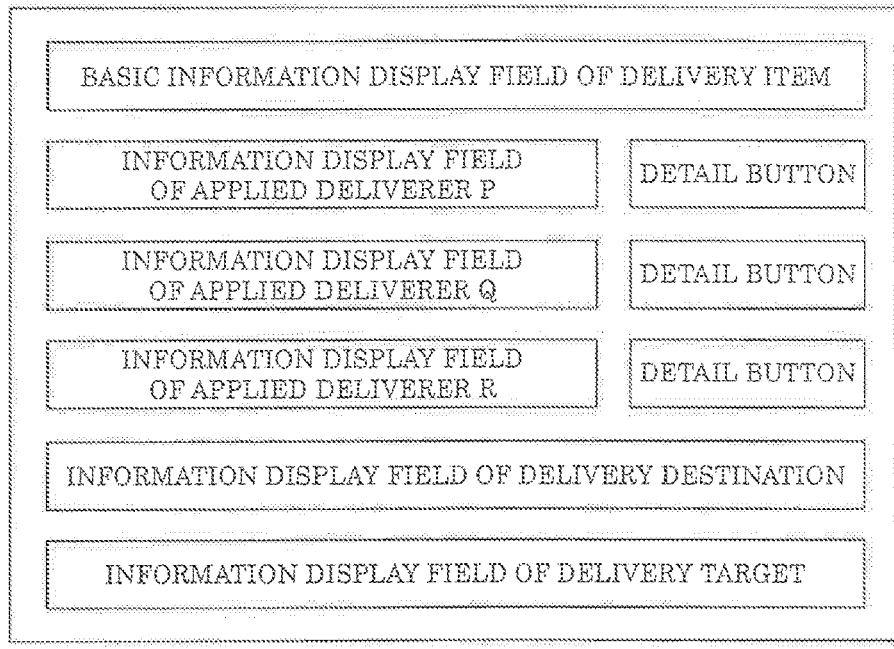

When there are plural applied deliverers, information of the applied deliverers, for example, names and the like is displayed as a list as illustrated in FIG. 6C. When the consigner pushes a "detail button" adjacent to a display field, the screen transits to the screen of FIG. 6B, and thus details of the selected deliverer is displayed.

FIG. 5 illustrates an example of the item management DB 16, which is configured of individual fields of item number, item receipt date, consigner, desired pickup/delivery date and time of the consigner, deliverer (applied deliverer) in charge of the item, status, priority of pickup/delivery, etc. Although not shown, there is further provided with a field of pickup/delivery information such as kind of cargo and delivery destination inputted by the consigner. Furthermore, there may be provided with a field of describing actual pickup/delivery date and time. In the status field, "application waiting" is a status of waiting for approval of the contract application by the consigner and represents that the deliverer in charge of the pickup/delivery has not been determined. This status represents, for example, a state until the contract application is approved by the consigner after the information concerning the request for pickup/delivery from the consigner is registered. "Under delivery" is a status that the deliverer in charge of the pickup/delivery is picking up/delivering the cargo. This status represents, for example, a state until the pickup/delivery is completed and the consigner notifies the server 6 of approval of the delivery completion after the deliverer in charge of the pickup/delivery is determined. "Completion confirmation" is a status that approval of the delivery completion is notified. The priority represents, for example, urgency degree/priority optionally set by the consigner, and may be a degree of earliness of desired delivery date and time.

Further, a status until the approval of the delivery completion is notified after the pickup/delivery is completed and the deliverer notifies the server 6 of the delivery completion may be displayed as "delivery completion".

The partitioning method and the names of these statuses have been described as an example but are not limited thereto, and other partitioning methods and names may instead be employed.

The server 6 registers and updates data in the item management DB 16 according to the input information and the notifications from the consigners and the deliverers.

Succeedingly, the consigner z checks the information (sex, age, personal history, etc.) of the individual applied deliverers, then selects one desired deliverer to display the screen thereof (FIG. 6B), and performs an operation of approving this deliverer using an approval button (step 5). For example, if the consigner z selects the deliverer Q out of the applied deliverers Q and R, the server 6 is notified from the terminal or the like 8 of the consigner z via the internet that the deliverer Q has been approved, and notifies the terminal or the like of the deliverer Q that the application has been approved by the consigner z, for example, by means of email (step 6). The server 6 may also notify the terminal or the like of the deliverer R that the application has not been approved by the consigner z, for example, by means of email. The deliverer Q, having received the email notification that the application has been approved by the consigner z, may notify the consigner z by means of telephone, for example, that the deliverer Q is in charge of the pickup/delivery. Consequently, "application waiting" of the status filed of the deliverer Q in No. 0003 of the item management DB 16 is changed into "under delivery", while a column of the deliverer R in No. 0003 is deleted.

Next, the deliverer Q, whose application was approved by the consigner z, contacts the consigner z by telephone, then visits and picks up a cargo at the designated pickup date and time (step 7). The deliverer Q visits the consigner z, then receives a cargo and exchanges a slip (step 8). Thereafter, the deliverer Q delivers the cargo to the delivery destination and issues a statement of the delivery (step 9). Then, using the terminal or the like, the deliverer Q activates the browser, then inputs a notification of the delivery completion using an item information input form for deliverer and transmits and transmits the notification to the server 6 (step 10).

Then, the server 6 receives the notification of delivery completion and notifies the terminal or the like of the consigner z of the delivery completion by means of, for example, email (step 11).

The consigner z receives the notification email of delivery completion and optionally inquires the delivery completion of the delivery destination by means of telephone or the like (step 12). The consigner z clicks a URL within the notification email of delivery completion to activate a browser, and approves the delivery completion using an item information input form for consigner. Further, the consigner z selects an appraisal of the deliverer Q in charge of the pickup/delivery, for example, one of appraisals such as "excellent", "good", "medium", "no good" and so on and inputs a comment if necessary (step 13).

Then, the server 6 receives the approval of delivery completion from the consigner z, then notifies the deliverer Q of the approval and also the appraisal selected by the consigner z, and so on by means of email (step 14).

The appraisal, etc. of the deliverer is recorded as a history in the deliverer DB 14 so as to be readable. For example, an average value of the appraisals and comments as to each deliverer may be displayed on the deliverer information screen of FIG. 6B such that a consigner can refer to the appraisals and comments at a time of approving a deliverer.

On the company-side PC 4 side of the delivery service company, the database information on a matching service is checked, payment of a delivery fee is demanded to a consigner and a delivery commission is paid to a deliverer (issuance and sending of bill, depositing in bank account, etc.), for each pickup/delivery (step 15).

As described above, the deliverer can correct own service area to an area near a delivery destination area by means of the information input form for deliverer, according to the delivery destination area using the terminal or the like.

In the above-described case, when a consigner resisters a new item, a deliverer registering the area of the consigner's address as the service area is automatically notified of the new item by means of email or the like. Regardless of such a notification, each deliverer may optionally access the item management DB 16 of the server 6 from own terminal or the like 10, search a new item and apply for contract of the new item. For example, if a desired item No. is clicked on the display screen of the item management DB 16 illustrated in FIG. 5, the screen may transit to the screen of FIG. 7A. Alternatively, such a notification may not be performed in the delivery service system.

The buttons illustrated in FIGS. 6A to 6C and FIGS. 7A and 7B are presented by way of example. Means for performing an operation/instruction such as selection, application, etc. is not limited to the button, and other means may be employed so long as such an operation/instruction is performed.

In the above-described case, in steps 2, 4, 6, 11, etc., the server 6 notifies the terminal or the like 8, 10 by means of email, and a person having received the email clicks the URL within the email to activate the browser. Alternatively, a person having received the email may directly access the server in response to the email to activate the browser.

The method of the notification is not limited to email, and other method may be employed. For example, the notification may be performed by means of push notification or the like, and a person having received the email may directly access the server in response to the notification.

In the above-described case, the database is configured of the consigner database (DB) 12, the deliverer database (DB) 14, and the item management database (DB) 16, but the database is not limited thereto. These databases may be appropriately combined to constitute one or two databases, or may be further divided into more segmented databases.

The pickup/delivery information of individual requested items is registered and managed in the item management DB 16 but may be registered and managed in the consigner DB 12.

This embodiment may be arranged in a manner that, at the time of contracting a new item (step 3), a deliverer can input possible pickup date and time and possible delivery date and time of the new item. That is, a field, in which possible pickup date and time and possible delivery date and time can be inputted, may be provided on the screen of FIG. 7A, and a deliverer may input possible pickup date and time and possible delivery date and time in this field. Then, the deliverer clicks the "application button" on the screen to apply for contract.

FIG. 8 illustrates an example of the item management DB 16 configured in such a manner, in which the field of possible pickup date and time and possible delivery date and time is added in the example of FIG. 5. In this case, a consigner may check possible pickup/delivery date and time as well as personal history, etc. of each applied deliverer, then select one deliverer (for example, deliverer of earliest delivery date and time) and perform an operation of approving the selected deliverer (step 5).

The embodiment is described as to the case where pickup/delivery of a cargo is performed by a single deliverer, but the invention can be applied to a case where pickup and delivery of a cargo is performed by different deliverers, respectively, or a case where pickup/delivery of a cargo is performed by three or more deliverers in cooperation to each other.

Explanation will be made as to a case where delivery of a cargo is performed by a deliverer different from a deliverer who picks up the cargo. In this case, the item management DB 16 is configured, for example, as illustrated in FIG. 9 in such a way that a field of a pickup deliverer and a field of a delivery deliverer are provided in addition to the configuration of FIG. 8. In step 3 described above, for example, with respect to an item of the consigner z, a deliverer desiring only pickup of a cargo, e.g., the deliverer Q clicks a "pickup application button" provided on the new item information screen while viewing this screen, whereby name of the deliverer Q is described in the field of deliverer in charge of pickup. Further, deliverers desiring only delivery of the cargo, e.g., the deliverers R and S each click a "delivery application button" provided on the new item information screen, whereby names of the deliverers R and S are described in the field of deliverer in charge of delivery.

The consigner z checks the information (personal history, etc.) of each of the individual applied deliverers Q, R and S, then selects the deliverer Q in charge of pickup and one of the deliverers R and S in charge of delivery on the screen, and performs an operation of approving the selected deliverers. For example, if the consigner z approves the contract applications by the deliverers Q and S, the deliverers Q and S perform the pickup/delivery of the cargo.

Incidentally, when a single deliverer performs both the pickup/delivery, the deliverer clicks a "pickup/delivery application button" provided on the new item information screen. When there are plural applications for each of a deliverer in charge of pickup and a deliverer in charge of delivery, a consigner can select an optional combination of one deliverer in charge of pickup and one deliverer in charge of delivery in the similar manner.

In this case, also, at the time of contracting a new item (step 3), a deliverer can input possible pickup date and time and possible delivery date and time of the new item. That is, a field, in which possible pickup date and time and possible delivery date and time can be inputted, may be provided on the screen of FIG. 7A. In step 3 described above, for example, with respect to an item of the consigner z, a deliverer desiring only pickup of a cargo, e.g., the deliverer Q inputs possible pickup date and time on the new item information screen and clicks the "pickup application button" provided on this screen, whereby name of the deliverer Q is described in the field of deliverer in charge of pickup and also the possible pickup date and time is described. Further, deliverers desiring only delivery of the cargo, e.g., the deliverers R and S each input possible delivery date and time on the new item information screen and click the "delivery application button" provided on the new item information screen, whereby names of the deliverers R and S are described in the field of deliverer in charge of delivery and also the possible delivery date and time is described.

The consigner z checks the information (personal history, possible pickup/delivery date and time, etc.) of each of the individual applied deliverers Q, R and S, then selects the deliverer Q in charge of pickup and one of the deliverers R and S in charge of delivery (for example, deliverer of earliest delivery date and time) on the screen, and performs an operation of approving the selected deliverers.

In this embodiment, an estimation amount of delivery fee of a cargo may be displayed on the screen for consigner. That is, at the time of registering a new item in step 1, information such as a size of cargo, a delivering method such as freezing or cooling, etc. may further be registered as cargo information. Then, when a consigner pushes the registration button illustrated in FIG. 6A, the server 6 may calculate an estimation amount of a delivery fee based on the inputted information (size of cargo, the number of cargos, delivery destination, etc.) and notify the terminal or the like 8 of the consigner of the calculation result by email. Thereafter, the consigner may click an URL within the email to display the estimation amount on the terminal or the like 8 of the consigner. Alternatively, an estimation button of delivery fee may be displayed on the item registration screen for consigner illustrated in FIG. 6A, and an estimation amount of delivery fee may be displayed on the terminal or the like 8 of the consigner in the similar manner when the consigner pushes the estimation button.

The server 6 may be provided with backup servers for the individual databases 12, 14 and 16. Alternatively, the backup servers for the individual databases 12, 14 and 16 of the server 6 may be provided on the company side PC (server) 4 side.

Figure 10:
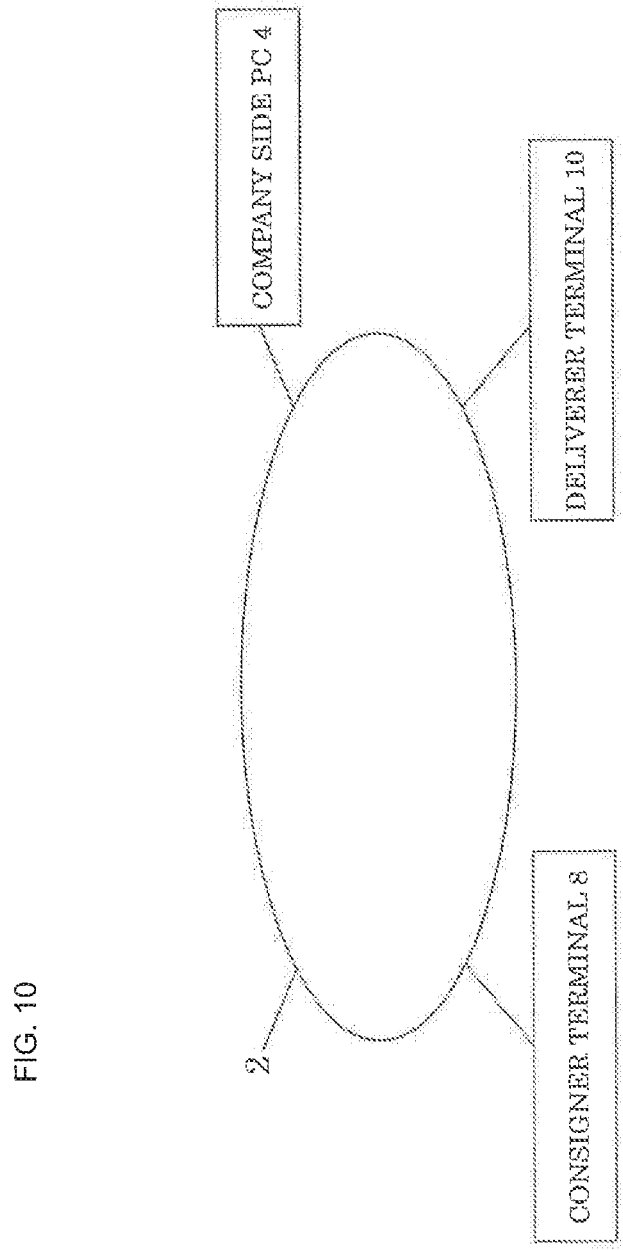
FIG. 10 is a schematic diagram illustrating configuration of the delivery service system according to the modification of the invention.

In this embodiment, the delivery service system according to the invention is executed using the server 6 on the internet 2 illustrated in FIG. 1. Alternatively, as illustrated in FIG. 10, the delivery service system may be executed using the company side PC (server) 4 without providing the server 6. In this case, the individual databases 12, 14 and 16 are provided in the company side PC 4. Thus, in this case, all the functions of the server 6 and the company side PC 4 described in the embodiment are executed only by the company side PC 4.

Hereinafter, the features of the delivery service system, etc. according to the invention will be listed below.

As basic premise, various data relating to the matching service is not recorded in any of the terminals or the like of deliverers/consigners. If such data is stored in the terminal, there may arise various fears such as ensuring of security, data falsification, and legal problems concerning the handling of personal information. The various data is therefore not stored in any of the terminals or the like of users (deliverers/consigners), and each user is only allowed to access the server from the terminal to read information stored in the server.

[1] The various data including personal information of deliverers/consigners is not stored in the terminals or the like of users (deliverers/consigners) but all stored in the databases in the server.

Each consigner (user) is only allowed to access the server from the terminal to read information stored in the server to read the information on the terminal via the internet using (the web browser of) the own terminal.

[2] When a consigner (user) edits own personal information, registration data or the like, the edited data of individual field is transmitted to the server via the internet using (the web browser of) the own terminal, whereby the corresponding data of the database is updated.

[3] The exchange of a slip, a statement of the delivery or the like after the agreement of contract concerning delivery work (item registration by consigner, application by deliverer, approval of deliverer by consigner) on the matching service is actually performed in a face-to-face manner between a deliverer and a consigner. Data in this case is not stored in the server.

[4] When a deliverer performs an operation of "delivery completion" and a consigner approves the delivery completion, the matching service is placed in a "completion" state of the delivery work.

[5] On the delivery service company side, the database information on the matching service is checked, payment of a delivery fee is demanded to a consigner and a delivery commission is paid to a deliverer (issuance and sending of bill, depositing in bank account, etc.), for each pickup/delivery.

The delivery service system, etc. according to the invention can attain the following effects.

1) Even if there is no deliverer near the address of a consigner, plural deliverers each registering the area of the consigner's address as the service area are each immediately notified of a new item of the consigner and therefore can apply for contract of the new item while viewing the new item information screen. Thus, pickup/delivery according to the desired pickup/delivery date and time of the consigner can be surely performed.

2) Even if pickup/delivery items are concentrated at a particular area, each deliverer can appropriately apply for contract of the pickup/delivery item while viewing the pickup/delivery information, etc. of the new items. Thus, concentration of new items on a particular one or ones of deliverers can be suppressed and hence the service can be provided more quickly.

3) A consigner can appropriately select a deliverer with reference to sex, age, personal history, etc. of each of applied deliverer candidates while viewing the deliverer information screen, whereby convenience of the consigner can be remarkably improved as compared with the related art.

4) A deliverer in charge of pickup/delivery is not determined under the control of the server of the delivery service company but determined according to voluntary matching between a consigner and deliverers. A deliverer is therefore allowed to have large flexibility or the like in selection of date, time and area with respect to the pickup/delivery, whereby convenience of the deliverer can be remarkably improved as compared with the related art. Similarly, convenience of the consigner can be improved.

Modification and application examples of the invention will be explained.

The invention can be applied to various delivery services such as a moving service as well as the pickup/delivery service for a cargo. In this case, in place of the item registration form on the item registration screen for consigner illustrated in FIG. 6A, an item registration screen for client and an item registration form provided so that a client can input information peculiar to moving concerning the content of the moving (for example, the number of people of family, layout of present house, type of present house, layout of new house, type of new house, budget, necessity of visit/estimation) as pickup/delivery information. Data contents of the consigner DB (client DB) 12 and the item management DB 16 is changed according to the inputted information. Plural deliverers can apply for a single item, and a client approves one of these delivery candidates.

The invention can also be applied to a shopping substitute service. In this case, also, in place of the item registration form on the item registration screen for consigner illustrated in FIG. 6A, an item registration screen for client and an item registration form provided so that a client can input articles, kind, the number of articles, budget, desired shop, etc., as shopping information in place of the pickup/delivery information. Data contents of the item management DB 16 is changed according to the inputted information. A deliverer registers a desired delivery area of purchased articles, that is, an area of client's address as a service area of the deliverer. In this case, information of the desired pickup date and time and the delivery destination in the pickup/delivery information in the aforesaid embodiment is not necessary. If the client and the delivery destination differ in address to each other, the client inputs information of the delivery destination using the item registration form to register in the item management DB 16.

Further, the invention can also be applied to other various services such as a cleaning service, a repair service, and a help service. In this case, using the configuration of the aforesaid embodiment, a person in charge of the service can be determined according to voluntary matching between a client and the person in charge of the service (service provider). A deliverer in the aforesaid embodiment is replaced by a service provider. The server includes a database which manages information of clients, information of service providers, and information concerning service items requested from the clients. The server registers, in the database, information of name, a service area, etc. of each service provider which is inputted in the server by being accessed from each of a plurality of service provider terminals via the internet. Also, the server registers, in the database, information of name, address, etc. of each client which is inputted in the server by being accessed from each of a plurality of client terminals via the internet. The server receives information of desired date and time, etc. concerning a service item of each client which is inputted in the server by being accessed from each of the plurality of client terminals via the internet, and registers the received information in the database for each item. Further, the server receives a contract application, as to a new item registered in the database, which is inputted with reference to the database within the server via the internet from the service provider terminal of a service provider whose registered service area contains address of a client of the new item. The server then registers the contract application from the service provider in the database and notifies the client terminal of this new item of the contract application. Thereafter, the server receives via the internet a notification representing approved one of the plural applied service providers, from the client terminal having received the contract applications as to the new item. Then, the server notifies the terminal of the approved service provider that the contract application is approved, whereby the approved service provider provides the service concerning the new item.

Hereinafter, typical features of the embodiment, modification and application examples according to the invention will be listed below.

[1] A delivery service system including a server which can be connected to a plurality of client terminals and a plurality of deliverer terminals via an internet, wherein the server includes a client database which manages information of the clients, a deliverer database which manages information of the deliverers, and an item management database which manages information concerning pickup/delivery items of the clients, the server registers, in the deliverer database, information of name, a pickup service area, etc. of each deliverer which is inputted in the server by being accessed from each of the plurality of deliverer terminals via the internet, the server registers, in the client database, information of name, address, etc. of each client which is inputted in the server by being accessed from each of the plurality of client terminals via the internet, the server receives information of desired pickup/delivery date and time, etc. concerning a pickup/delivery item of each client which is inputted in the server by being accessed from each of the plurality of client terminals via the internet, and registers the received information in the item management database for each item, the server searches, as to each new item registered in the item management database, deliverers each registering an area of client's address of the new item as the service area with reference to the deliverer database, and notifies the terminal of each searched deliverer of the new item, the server receives a contract application which is inputted with reference to the item management database within the server via the internet from each deliverer terminal having been notified of the new item, then registers the contract application in the management database and notifies the client terminal of the new item of the contract application via an email, and the server receives via the internet a notification representing approved one of the deliverers having inputted the contract application, from the client terminal having received the contract applications as to the new item, and notifies the terminal of the approved deliverer via an email that the contract application is approved, whereby the approved deliverer performs pickup/delivery of the new item.

[2] The delivery service system described in [1], wherein the deliverer terminals each can appropriately correct the information of pickup service area of the deliverer corresponding to the deliverer terminal via the internet.

[3] A delivery service system including a server which can be connected to a plurality of client terminals and a plurality of deliverer terminals via an internet, wherein the server includes a database which manages information of the clients, information of the deliverers, and information concerning pickup/delivery items of the clients, the server registers, in the database, information of name, a pickup service area, etc. of each deliverer which is inputted in the server by being accessed from each of the plurality of deliverer terminals via the internet, the server registers, in the database, information of name, address, etc. of each client which is inputted in the server by being accessed from each of the plurality of client terminals via the internet, the server receives information of desired pickup/delivery date and time, etc. concerning a pickup/delivery item of each client which is inputted in the server by being accessed from each of the plurality of client terminals via the internet, and registers the received information in the database for each item, the server searches, as to each new item registered in the database, deliverers each registering an area of client's address of the new item as the service area with reference to the database, and notifies the terminal of each searched deliverer of the new item, the server receives a contract application which is inputted with reference to the database within the server via the internet from each deliverer terminal having been notified of the new item, then registers the contract application in the database and notifies the client terminal of the new item of the contract application, and the server receives via the internet a notification representing approved one of the deliverers having inputted the contract application, from the client terminal having received the contract applications as to the new item, and notifies the terminal of the approved deliverer that the contract application is approved, whereby the approved deliverer performs pickup/delivery of a cargo of the new item.

[4] A delivery service system including a server which can be connected to a plurality of client terminals and a plurality of deliverer terminals via an internet, wherein the server includes a database which manages information of the clients, information of the deliverers, and information concerning pickup/delivery items of the clients, the server registers, in the database, information of name, a pickup service area, etc. of each deliverer which is inputted in the server by being accessed from each of the plurality of deliverer terminals via the internet, the server registers, in the database, information of name, address, etc. of each client which is inputted in the server by being accessed from each of the plurality of client terminals via the internet, the server receives information of desired pickup/delivery date and time, etc. concerning a pickup/delivery item of each client which is inputted in the server by being accessed from each of the plurality of client terminals via the internet, and registers the received information in the database for each item, the server receives a contract application, as to a new item registered in the database, which is inputted with reference to the database within the server via the internet from the deliverer terminal of one deliverer whose registered service area contains address of the client of the new item, then registers the contract application in the database and notifies the client terminal of the new item of the contract application, and the server receives via the internet a notification representing approved one of the deliverers having inputted the contract application, from the client terminal having received the contract applications as to the new item, and notifies the terminal of the approved deliverer that the contract application is approved, whereby the approved deliverer performs pickup/delivery of a cargo of the new item.

[5] A delivery service system including a server which can be connected to a plurality of client terminals and a plurality of deliverer terminals via an internet, wherein the server includes a database which manages information of the clients, information of the deliverers, and information concerning delivery items of the clients, the server registers, in the database, information of name, a service area, etc. of each deliverer which is inputted in the server by being accessed from each of the plurality of deliverer terminals via the internet, the server registers, in the database, information of name, address, etc. of each client which is inputted in the server by being accessed from each of the plurality of client terminals via the internet, the server receives information of desired delivery date and time, etc. concerning a delivery item of each client which is inputted in the server by being accessed from each of the plurality of client terminals via the internet, and registers the received information in the database for each item, the server searches, as to each new item registered in the database, deliverers each registering an area of client's address of the new item as the service area with reference to the database, and notifies the terminal of each searched deliverer of the new item, the server receives a contract application which is inputted with reference to the database within the server via the internet from each deliverer terminal having been notified of the new item, then registers the contract application in the database and notifies the client terminal of the new item of the contract application, and the server receives via the internet a notification representing approved one of the deliverers having inputted the contract application, from the client terminal having received the contract applications as to the new item, and notifies the terminal of the approved deliverer that the contract application is approved, whereby the approved deliverer performs delivery of an article of the new item.

[6] A delivery service method using a server which can be connected to a plurality of client terminals and a plurality of deliverer terminals via an internet, and includes a database which manages information of the clients, information of the deliverers, and information concerning pickup/delivery items of the clients, the method includes:

registering, in the database, information of name, a pickup service area, etc. of each deliverer which is inputted in the server by being accessed from each of the plurality of deliverer terminals via the internet;

registering, in the database, information of name, address, etc. of each client which is inputted in the server by being accessed from each of the plurality of client terminals via the internet;

registering, for each item, information of desired pickup/delivery date and time, etc. concerning a pickup/delivery item of each client which is inputted in the server by being accessed from each of the plurality of client terminals via the internet;

searching, as to each new item registered in the database, deliverers each registering an area of client's address of the new item as the service area with reference to the database, and notifying the terminal of each searched deliverer of the new item;

receiving a contract application which is inputted with reference to the database within the server via the internet from each deliverer terminal having been notified of the new item, then registering the contract application in the database and notifying the client terminal of the new item of the contract application; and receiving via the internet a notification representing approved one of the deliverers having inputted the contract application, from the client terminal having received the contract applications as to the new item, and notifying the terminal of the approved deliverer that the contract application is approved, whereby the approved deliverer performs pickup/delivery of a cargo of the new item.

[7] A server for delivery service which can be connected to a plurality of client terminals and a plurality of deliverer terminals via an internet, and includes a database which manages information of the clients, information of the deliverers, and information concerning pickup/delivery items of the clients, wherein the server registers, in the database, information of name, a pickup service area, etc. of each deliverer which is inputted in the server by being accessed from each of the plurality of deliverer terminals via the internet, the server registers, in the database, information of name, address, etc. of each client which is inputted in the server by being accessed from each of the plurality of client terminals via the internet, the server registers, for each item, information of desired pickup/delivery date and time, etc. concerning a pickup/delivery item of each client which is inputted in the server by being accessed from each of the plurality of client terminals via the internet, the server receives a contract application, as to a new item registered in the database, which is inputted with reference to the database within the server via the internet from the deliverer terminal of one deliverer whose registered service area contains address of the client of the new item, then registers the contract application in the database and notifies the client terminal of the new item of the contract application, and the server receives via the internet a notification representing approved one of the deliverers having inputted the contract application, from the client terminal having received the contract applications as to the new item, and notifies the terminal of the approved deliverer that the contract application is approved, whereby the approved deliverer performs pickup/delivery of a cargo of the new item.

[8] A plurality of deliverer terminals in a delivery service system including a server which can be connected to a plurality of client terminals and the plurality of deliverer terminals via an internet, wherein the server includes a database which manages information of the clients, information of the deliverers, and information concerning pickup/delivery items of the clients, the server registers, in the database, information of name, address, etc. of each client which is inputted in the server by being accessed from each of the plurality of client terminals via the internet, and the server registers information of desired pickup/delivery date and time, etc. concerning a pickup/delivery item of each client which is inputted in the server by being accessed from each of the plurality of client terminals via the internet, wherein each of the plurality of deliverer terminals accesses the server via the internet, then inputs and registers, in the database, information of name, a pickup service area, etc. of the associated deliverer, each deliver terminal is notified of a new item from the sever when a pickup/delivery item is requested from a client whose address is contained in the registered pickup service area of the associated deliverer, each deliver terminal, when applying for the notified item with reference to the database, inputs an application and notifies the sever of the application, and each deliver terminal receives via the internet a notification representing whether or not the application is approved from the client terminal of the applied item, in response to the inputted application, whereby the approved deliverer performs pickup/delivery of a cargo of the new item.

[9] A display screen of each of a plurality of deliverer terminals in a delivery service system including a server which can be connected to a plurality of client terminals and the plurality of deliverer terminals via an internet, wherein the server includes a database which manages information of the clients, information of the deliverers, and information concerning pickup/delivery items of the clients, the server registers, in the database, information of name, address, etc. of each client which is inputted in the server by being accessed from each of the plurality of client terminals via the internet, and the server registers information of desired pickup/delivery date and time, etc. concerning a pickup/delivery item of each client which is inputted in the server by being accessed from each of the plurality of client terminals via the internet, wherein the display screen is switchable between a screen which displays, when pickup/delivery items are requested from respective clients whose addresses are contained in a pickup service area of the associated deliverer, a list of the items and a button for selecting the items, and a screen which displays, when a pickup/delivery item is requested from the client whose address is contained in a pickup service area of the associated deliverer, a part of the information concerning the item registered in the database and a button for applying the item.

[10] A program for making a server, which can be connected to a plurality of client terminals and the plurality of deliverer terminals via an internet and includes a database which manages information of the clients, information of the deliverers, and information concerning pickup/delivery items of the clients, realize functions of:

registering, in the database, information of name, a pickup service area, etc. of each deliverer which is inputted in the server by being accessed from each of the plurality of deliverer terminals via the internet;

registering, in the database, information of name, address, etc. of each client which is inputted in the server by being accessed from each of the plurality of client terminals via the internet;

registering, for each item, information of desired pickup/delivery date and time, etc. concerning a pickup/delivery item of each client which is inputted in the server by being accessed from each of the plurality of client terminals via the internet;

receiving a contract application, as to a new item registered in the database, which is inputted with reference to the database within the server via the internet from the deliverer terminal of one deliverer whose registered service area contains address of the client of the new item, then registering the contract application in the database and notifying the client terminal of the new item of the contract application, and receiving via the internet a notification representing approved one of the deliverers having inputted the contract application, from the client terminal having received the contract applications as to the new item, and notifying the terminal of the approved deliverer that the contract application is approved.

[11] A computer readable recording medium which stores a program for making a server, which can be connected to a plurality of client terminals and the plurality of deliverer terminals via an internet and includes a database which manages information of the clients, information of the deliverers, and information concerning pickup/delivery items of the clients, realize functions of:

registering, in the database, information of name, a pickup service area, etc. of each deliverer which is inputted in the server by being accessed from each of the plurality of deliverer terminals via the internet;

registering, in the database, information of name, address, etc. of each client which is inputted in the server by being accessed from each of the plurality of client terminals via the internet;

registering, for each item, information of desired pickup/delivery date and time, etc. concerning a pickup/delivery item of each client which is inputted in the server by being accessed from each of the plurality of client terminals via the internet;

receiving a contract application, as to a new item registered in the database, which is inputted with reference to the database within the server via the internet from the deliverer terminal of one deliverer whose registered service area contains address of the client of the new item, then registering the contract application in the database and notifying the client terminal of the new item of the contract application, and receiving via the internet a notification representing approved one of the deliverers having inputted the contract application, from the client terminal having received the contract applications as to the new item, and notifying the terminal of the approved deliverer that the contract application is approved.

[12] A service providing system including a server which can be connected to a plurality of client terminals and a plurality of service provider terminals via an internet, wherein the server includes a database which manages information of the clients, information of the service providers, and information concerning service items of the clients, the server registers, in the database, information of name, a service area, etc. of each service provider which is inputted in the server by being accessed from each of the plurality of service provider terminals via the internet, the server registers, in the database, information of name, address, etc. of each client which is inputted in the server by being accessed from each of the plurality of client terminals via the internet, the server receives information of desired date and time, etc. concerning a service item of each client which is inputted in the server by being accessed from each of the plurality of client terminals via the internet, and registers the received information in the database for each item, the server receives a contract application, as to a new item registered in the database, which is inputted with reference to the database within the server via the internet from the service provider terminal of one service provider whose registered service area contains address of the client of the new item, then registers the contract application in the database and notifies the client terminal of the new item of the contract application, and the server receives via the internet a notification representing approved one of the service providers having inputted the contract application, from the client terminal having received the contract applications as to the new item, and notifies the terminal of the approved service provider that the contract application is approved, whereby the approved service provider provides service of the new item.

The invention is not limited to the aforesaid embodiment, and it will be apparent for those skilled in the art that various changes and modifications are possible without departing from the spirit and range of the invention.

DESCRIPTION OF REFERENCE NUMERALS

1 - - - delivery service system, 2 - - - internet, 4 - - - company-side PC, 6 - - - server, 8 - - - consigner terminal or the like, 10 - - - deliverer terminal or the like, 12 - - - consigner DB, 14 - - - deliverer DB, 16 - - - item management DB

The invention claimed is:
1. A delivery service system comprising:
a client terminal; and
a server configured to be connectable to the client terminal and a deliverer terminal via a network, wherein
the server includes a database configured to manage information concerning a delivery item of a client and an input/output unit,
the deliverer terminal includes a contract application input unit,
the client terminal includes a contract application approval input unit,
the server receives, by the input/output unit, information, including a desired delivery date and time and address of a delivery destination concerning the delivery item of the client, which is inputted from the client terminal, and registers the received information in the database,
the server, receives, by the input/output unit, a contract application which is inputted from the contract application input unit of the deliverer terminal in relation to a new item registered in the database, registers the received contract application in the database, and notifies the client terminal of the new item of the contract application via the input/output unit,
the server receives, by the input/output unit, notification, representing whether or not the deliverer having inputted the contract application as to the new item is to be approved, which is inputted from the contract application approval input unit of the client terminal, registers the received notification in the database, and notifies the client terminal of the approved deliverer via the input/output unit that the contract application is approved, so that the approved deliverer performs delivery of the new item, and the server registers, in the database, the desired delivery data and time of the client, the information of the deliverer having inputted the contract application, the delivery destination and status information representing whether the contract application of the deliverer is approved by the client, for each item.

2. A delivery service system according to claim 1, wherein the status information in the database includes a first status representing a state until the contract application of the deliverer is approved by the client, and a second status representing that the contract application of the deliverer has been approved by the client, and the server changes the first status to the second status in response to the approval of the deliverer from the client terminal.

3. A delivery service method in a delivery service system including a client terminal, and a server configured to be connectable to the client terminal and a deliverer terminal via a network and including a database configured to manage information concerning a delivery item of a client, the method comprising:

receiving, by an input/output unit of the server, information including a desired delivery date and time and address of a delivery destination concerning a delivery item of a client, which is inputted from the client terminal, and registering the received information in the database by the server;

receiving, by the input/output unit of the server, a contract application which is inputted from a contract application input unit of the deliverer terminal in relation to a new item registered in the database, registering the received contract application in the database by the server, and notifying the client terminal of the new item of the contract application via the input/output unit;

receiving, by the input/output unit of the server, notification, representing whether or not the deliverer having inputted the contract application as to the new item is to be approved, which is inputted from a contract application approval input unit of the client terminal, registering the received notification in the database by the server, and notifying the client terminal of the approved deliverer via the input/output unit that the contract application is approved, so that the approved deliverer performs delivery of the new item; and registering, by the server in the database, the desired delivery date and time of the client, the information of the deliverer having inputted the contract application, the delivery destination and status information representing whether the contract application of the deliverer is approved by the client, for each item.

4. A delivery service method according to claim 3, wherein the status information includes a first status representing a state until the contract application of the deliverer is approved by the client, and a second status representing that the contract application of the deliverer has been approved by the client, and the method further comprising:

changing, by the server, the first status to the second status in response to the approval of the deliverer from the client terminal.

5. A service providing system comprising:
a client terminal; and
a server configured to be connectable to the client terminal and a service provider terminal via a network, wherein the server includes a database configured to manage information concerning a service item of a client and an input/output unit, the service provider terminal includes a contract application input unit, the client terminal includes a contract application approval input unit, the server receives, by the input/output unit, information, including a desired service date and time and address of a service target concerning the service item of the client, which is inputted from the client terminal, and registers the received information in the database, the server receives, by the input/output unit, a contract application which is inputted from the contract application input unit of the service provider terminal in relation to a new item registered in the database, registers the received contract application in the database, and notifies the client terminal of the new item of the contract application via the input/output unit, the server receives, by the input/output unit, notification, representing whether or not the service provider having inputted the contract application as to the new item is to be approved, which is inputted from the contract application approval input unit of the client terminal, registers the received notification in the database, and notifies the client terminal of the approved service provider that the contract application is approved via the input/output unit, so that the approved service provider performs service of the new item, and the server registers, in the database, the desired service data and time of the client, the information of the service provider having inputted the contract application, the service target and status information representing whether the contract application of the service provider is approved by the client, for each item.

6. A service providing system according to claim 5, wherein the status information includes a first status representing a state until the contract application of the service provider is approved by the client, and a second status representing that the contract application of the service provider has been approved by the client, and the server changes the first status to the second status of the status information in response to the approval of the service provider from the client terminal.

7. A service providing method in a service providing system including a client terminal, and a server configured to be connectable to the client terminal and a service provider terminal via a network and including a database configured to manage information concerning a service providing item of a client, the method comprising:

receiving, by an input/output unit of the server, information, including a desired date and time and address of a service target concerning a service item of a client, which is inputted from the client terminal, and registering the received information in the database by the server;

receiving, by the input/output unit of the server, a contract application which is inputted from the service provider terminal in relation to a new item registered in the database, registering the received contract application in the database by the server, and notifying the client terminal of the new item of the contract application via the input/output unit;

receiving, by the input/output unit of the server, information, representing whether or not the service provider having inputted the contract application as to the new item is to be approved, which is inputted from a contract application approval input unit of the client terminal registering the received notification in the database by the server, and notifying the client terminal of the approved service provider via the input/output unit that the contract application is approved, so that the approved service provider performs service of the new item; and registering, by the server in the database, the desired service date and time of the client, the information of the service provider having inputted the contract application, the service target and status information representing whether the contract application of the service provider is approved by the client, for each item.

8. A service providing method according to claim 7, wherein the status information includes a first status representing a state until the contract application of the service provider is approved by the client, and a second status representing that the contract application of the service provider has been approved by the client, and the method further comprising:

changing, by the server, the first status to the second status in response to the approval of the service provider from the client terminal.

* * * * *